United States Patent
Lee et al.

(10) Patent No.: US 11,921,080 B2
(45) Date of Patent: Mar. 5, 2024

(54) GAS SENSOR ARRAY HAVING SHARED FIELD EFFECT TRANSISTOR

(71) Applicant: KOREA ELECTRONICS TECHNOLOGY INSTITUTE, Seongnam-si (KR)

(72) Inventors: Kook Nyung Lee, Seoul (KR); Woo Kyeong Seong, Seongnam-si (KR); Won Hyo Kim, Yongin-si (KR); Dong Ki Hong, Pyeongtaek-si (KR); Hye Lim Kang, Chungcheongbuk-do (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 476 days.

(21) Appl. No.: 17/139,517

(22) Filed: Dec. 31, 2020

(65) Prior Publication Data

US 2021/0255139 A1   Aug. 19, 2021

(30) Foreign Application Priority Data

Feb. 18, 2020   (KR) .......................... 10-2020-0019832

(51) Int. Cl.
*G01N 27/414*   (2006.01)
(52) U.S. Cl.
CPC ................ *G01N 27/4141* (2013.01)
(58) Field of Classification Search
CPC ........................................ G01N 27/414–4148
See application file for complete search history.

(56) References Cited

U.S. PATENT DOCUMENTS

| | | | |
|---|---|---|---|
| 6,624,637 B1 * | 9/2003 | Pechstein | G01N 27/4148 324/438 |
| 2019/0383769 A1 * | 12/2019 | Yu | G01N 27/127 |
| 2022/0260519 A1 * | 8/2022 | Mizuno | G01N 33/0031 |

FOREIGN PATENT DOCUMENTS

| | | | | |
|---|---|---|---|---|
| KR | 2018-0080671 | * | 7/2018 | ............ B01L 3/5027 |
| KR | 10-2019-0004980 A | | 1/2019 | |
| KR | 10-2019-0119617 A | | 10/2019 | |

OTHER PUBLICATIONS

Machine language translation of KR 10-2018-0080671 (Year: 2018).*
Korean Office Action dated Jun. 21, 2021, in connection with the Korean Patent Application No. 10-2020-0019832.

* cited by examiner

*Primary Examiner* — Erik Kielin
(74) *Attorney, Agent, or Firm* — Hauptman Ham, LLP

(57) ABSTRACT

The gas sensor according to an exemplary embodiment of the present invention comprises: an FET device including one or more gate electrodes; a sensor array part including a plurality of sensors, in which a first electrode of each sensor is connected to at least one gate electrode of the plurality of gate electrodes in the FET device; and a controller detecting a gas using a current between a drain-source in response to voltage changes in the gate electrode of the FET device, wherein each sensor includes: a first electrode connected to a gate electrode of the FET device; a second electrode receiving an operating voltage through a switch controlled by the controller; and a detection film interposed between the first electrode and the second electrode.

10 Claims, 6 Drawing Sheets

GAS SENSOR ARRAY HAVING SHARED FIELD EFFECT TRANSISTOR

CROSS REFERENCE TO RELATED APPLICATIONS

Pursuant to 35 U.S.C. § 119 (a), this application claims the benefit of earlier filing dates and rights of priority to Korean Patent Application No.: 10-2020-0019832 filed on Feb. 18, 2020, the contents of which are hereby incorporated by reference in their entirety.

TECHNICAL FIELD

The teachings in accordance with exemplary and non-limiting embodiments of this invention relate generally to a gas sensor, and more particularly to a gas sensor configured to sense the gas in the air by using an FET (Field Effect Transistor).

Technical Background

Recently, gas sensors of various structures are being developed in order to detect various types of harmful gases that cause environmental problems. Representative gas sensors thereof include resistive type gas sensors having semiconductors as detection material, gas sensors using infrared light, optical gas sensors and FET type gas sensors, and among those gas sensors, particularly, researches are gradually on the increase about gas sensors using FET devices capable of being miniaturized, driven at a low power and converged with CMOS circuits such as low-noise amplification circuits.

In general, a gas sensor using an FET is formed with a gas detection film structure by allowing a floating gate to be disposed at an upper surface of a substrate, and a control gate to be disposed at a lateral surface whereby an upper surface of the floating gate and the control gate are simultaneously covered.

In the structure like this, due to structural limitations in which a gas detection film must be so disposed as to allow being contacted to a lateral surface of a gate electrode of an FET, disadvantages arise in that a sensor array formed with a gas detection film for detecting various types of gases is difficult to be manufactured.

DETAILED DESCRIPTION OF THE INVENTION

Technical Subject

It is an object of the present invention to provide a gas sensor configured to detect a gas in the air through a gas detection sensor including an FET device and a sensor array. Technical problems to be solved by the present invention are not restricted to the abovementioned, and any other technical problems not mentioned so far will be clearly appreciated from the following description by skilled in the art.

Technical Solution

In one general aspect of the present invention in order to solve the abovementioned problems/disadvantages, there may be provided a gas sensor, comprising:
an FET device including one or more gate electrodes;
a sensor array part including a plurality of sensors, in which a first electrode of each sensor is connected to at least one gate electrode of the plurality of gate electrodes in the FET device; and
a controller detecting a gas using a current between a drain-source in response to voltage changes in the gate electrode of the FET device, wherein each sensor includes:
a first electrode connected to a gate electrode of the FET device;
a second electrode receiving an operating voltage through a switch controlled by the controller; and
a detection film interposed between the first electrode and the second electrode Preferably, but not necessarily, the FET device may include a first gate electrode and a second gate electrode, wherein the first gate electrode is applied with a reference voltage setting a current between the drain-source as an initial value, and the second gate electrode is connected to a first electrode of each sensor.

Preferably, but not necessarily, the FET device may include a first gate electrode and a second gate electrode, wherein the first gate electrode may be connected to at least one first electrode in the plurality of sensors, and the second gate electrode may be connected to a remaining first electrode in the plurality of sensors.

Preferably, but not necessarily, the FET device may include a drain electrode, wherein the drain electrode may be connected to an input terminal of OP-amp and an output terminal of the OP-amp may be connected to a controller.

Preferably, but not necessarily, the controller may control the switch to allow the operating voltage to be sequentially applied to the second electrode of each sensor.

Preferably, but not necessarily, the detection film of each sensor may be a mutually different type of detection film of a different sensor.

Preferably, but not necessarily, the sensor array part may further include a heater.

In another general aspect of the present invention, there may be provided a gas sensor comprising:
an FET device;
a sensor array part including a plurality of sensors, a first electrode of each sensor being connected to a gate electrode of the FET device; and
a controller detecting a gas using a current between drain-source in response to voltage changes of the gate electrode of the FET device, wherein
each sensor includes;
a first electrode connected to the gate electrode of the FET device;
a second electrode receiving an operating voltage through a switch controlled by the controller; and
a detection film interposed between the first electrode and the second electrode.

Preferably, but not necessarily, the FET device may include a drain electrode, the drain electrode may be connected to an input terminal of OP-amp, and an output terminal of the OP-amp may be connected to the controller.

Preferably, but not necessarily, the controller may control the switch to allow the operating voltage to be sequentially applied to the second electrode of each sensor.

In still another general aspect of the present invention, there may be provided a gas sensing method, comprising:
applying an operating voltage to one sensor in a plurality of sensors forming a sensor array part;

detecting a current between a drain-source in response to voltage changes of first gate electrode of FET device connected to a plurality of sensors; and detecting a gas using a current change between the drain-source.

Preferably, but not necessarily, each sensor may include a mutually different type of detection film.

Advantageous Effects of Invention

The gas sensor according to an exemplary embodiment of the present invention has an advantageous effect in that signal processing and interpretation of a gas sensor array may be simple because of utilizing a single FET device.

Furthermore, production and mass-production of a sensor may be easy because of a structure in which a sensor is integrated to a separate substrate, and production of gas sensor array with a uniform characteristic may be inexpensive and simple.

Still furthermore, a selection ratio of detected gas may be enhanced because the gas sensor array may include a plurality of sensors, and each sensor may be manufactured through a variety of modifications to allow detecting various gases.

Still furthermore, drawbacks of deviations for each sensor or drift characteristics, which are problems of conventional metal oxide material-based gas sensor, can be improved because of a structure of reading capacitor change using a single FET device.

Still furthermore, a nano FET device may be formed with two gate electrodes each at an upper surface and at a lower surface of nano channel, and both the two gate electrodes may be connected to a sensor for use to thereby enhance the efficiency of gas detection, and one of the two gate electrodes may be connected to a sensor and remaining one gate electrode may be applied with a reference voltage to thereby enable a free adjustment of an initial operation point of nano channel.

Still furthermore, absorption of gas particles can be efficiently realized by heating only a substrate of a gas sensor array part because the gas sensor array part and the FET device are separately formed, and the drift characteristic of semiconductor device based on temperature can be improved because the gas reaction temperature and FET device temperature can be separated.

The advantageous effects of the present invention are not limited to the abovementioned descriptions and various other effects may be included within the present specification.

BEST MODE

Hereinafter, exemplary embodiments of the present invention will be described in detail with reference to the accompanying drawings.

However, the inventive concepts and ideas of the present invention are not limited to some of the exemplary embodiments to be explained but may be realized in various forms, and one or more elements may be selectively coupled and substituted thereamong as long as within the scope of the technical concepts of the present invention.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art in the present application.

Furthermore, the terminology used herein is for the purpose of describing exemplary embodiments only and is not intended to be limiting. As used herein, the singular forms may be intended to include the plural forms as well, unless the context clearly indicates otherwise, and when described in any one of "A, B and C (or more than one)", one or more combinations combinable by all of A, B and C may be included.

Furthermore, in describing elements of exemplary embodiments of the present invention, terms such as first, second, A, B, (a) and (b) may be used. These terms may be only used to distinguish one element from another element, and essence, order or sequence of relevant elements will not be limited by these terms.

Furthermore, when an element is referred to as being "on", "engaged to", "connected to" or "coupled to" another element, it may be interpreted as being directly on, engaged, connected or coupled to the other element, or intervening elements may be present therebetween.

Furthermore, when an element is referred to as being "on (above)" or "below (under)" another element, it may be directly on (above) or below (under) the other element, or one or more intervening elements may be present between two elements. Thus, the example term "on (above)" or "below (under)" can encompass both an orientation of above and below.

Figure 1:
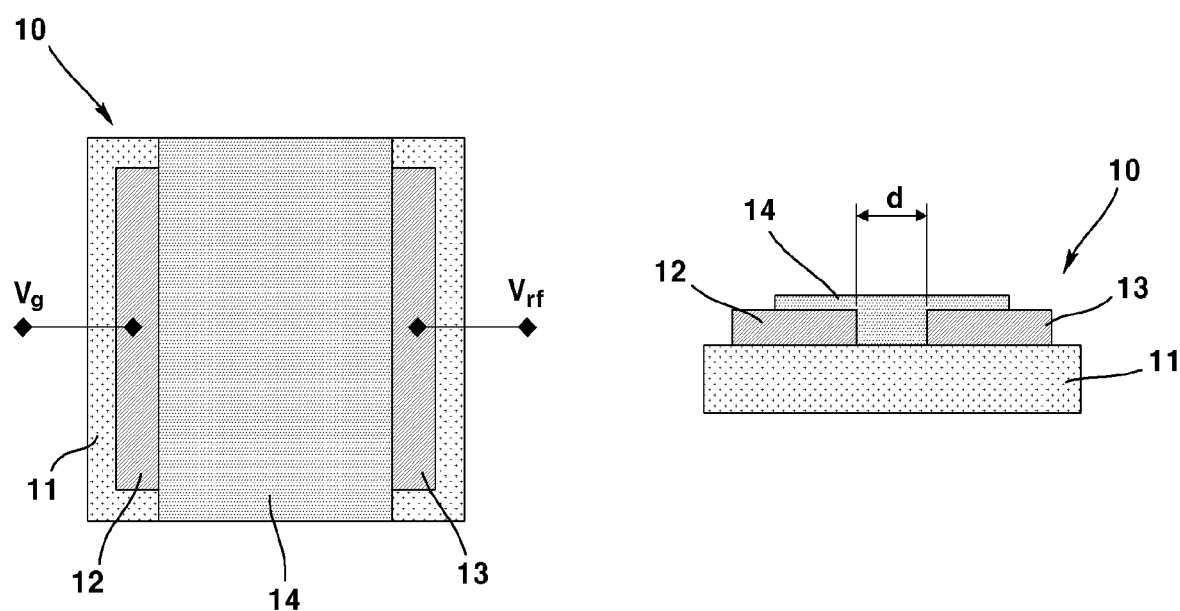
FIG. 1 illustrates a plan view and a front view of a sensor according to an exemplary embodiment of the present invention.
Figure 2:
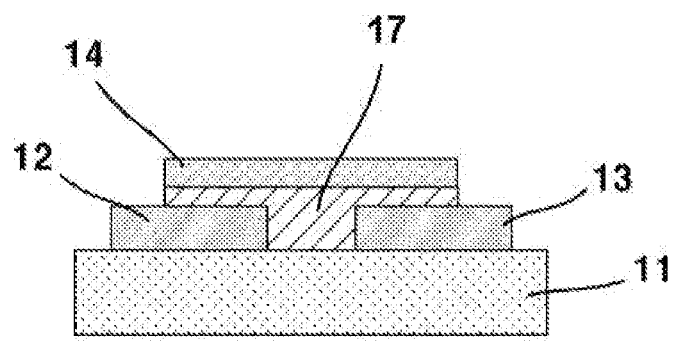
FIG. 2 illustrates a front view of a sensor according to another exemplary embodiment of the present invention.

FIG. 1 illustrates a plan view and a front view of a sensor of a sensor array part (10) according to an exemplary embodiment of the present invention, and FIG. 2 illustrates a front view of a sensor of a sensor array part (10) according to another exemplary embodiment of the present invention.

The sensor array part (10) according to an exemplary embodiment of the present invention may include a plurality of sensors, and may further include a PCB (Printed Circuit Board) substrate (15) and a heater (not shown). Each of the sensor may include a substrate (11), a first electrode (12), a second electrode (13) and a detection film (14). To be more specific, the sensor may be configured in such a manner that the first electrode (12) and the second electrode (13) are disposed on an upper surface of the substrate (11) by being spaced apart at a predetermined distance (d), and the detection film (14) is interposed between the first electrode (12) and the second electrode (13) to be partially stretched over an upper surface of the first electrode (12) and the second electrode (13).

The substrate (11) may be a silicon substrate. The substrate (11)-based sensor array has an advantageous effect in that it may be efficiently coupled with other structures, easy in mass-production and simple in process because of using a commonly used wafer.

The first electrode (12) and the second electrode (13) may be formed with mutually different materials and may be also formed with same material. The first electrode (12) may be connected to a gate electrode (25), and the second electrode (13) may be applied with an operating voltage (Vrf) through a switch (16).

The detection film (14) may generate a chemical reaction with oxides of detection film (14) because of being absorbed with gas particles. As a result, the detection film (14) may include various types of metal oxides to allow the gas particles to be efficiently absorbed to the detection film (14), and may be a mixture mixed with catalytic materials, or may be a structure in which nano particles are dispersed. Furthermore, the detection film (14) may be formed with a film structure.

Furthermore, as illustrated in FIG. 2, each sensor according to another exemplary embodiment of the present invention may further include an insulation layer (17) between the detection film (14) and the substrate (11). When the detection film (14) is formed with a metal material, a metal oxide having a great non-conductive characteristic may be utilized as an insulator in order to form the sensor in a capacitor structure. For example, in case of a sensor detecting hydrogen, the detection film (14) may be formed with palladium (Pd) and the insulation layer (17) may be formed with tantalum oxide (TaO2), whereby the detection film (14) and the insulation layer (17) may be formed with a multi-filmed structure.

Figure 3:
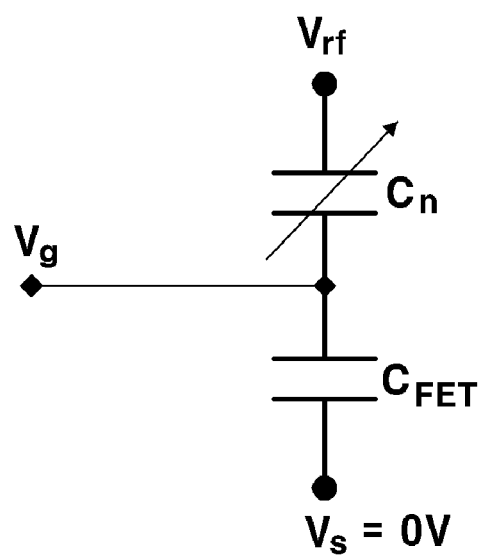
FIGS. 3 and 4 illustrate equivalent circuits of gas sensor according to an exemplary embodiment of the present invention.
Figure 4:
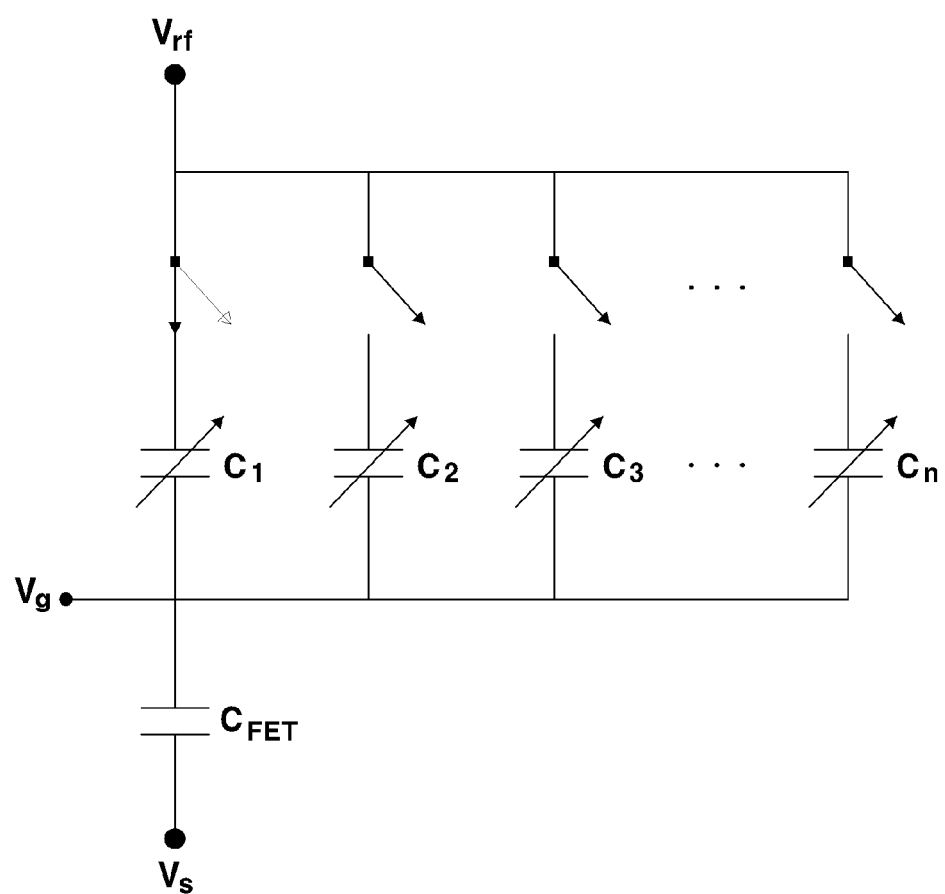

FIGS. 3 and 4 illustrate equivalent circuits of gas sensor (100) according to an exemplary embodiment of the present invention in order to explain an operation principle of the gas sensor (100).

A total operation principle of gas sensor (100) may be expressed by an equivalent circuit as shown in FIG. 3. Referring to FIG. 3, the sensor may be expressed by a first capacitor (Cn) where a capacitance is changed by gas particles absorbed into the detection film (14), and an FET device (20) may be expressed by a second capacitor ($C_{FET}$).

To be more specific, the first capacitor (Cn) and the second capacitor ($C_{FET}$) may be serially connected, an operating voltage (Vrf) may be applied to one end of the first capacitor (Cn) and a source voltage (Vs) of 0[V] may be grounded to one end of second capacitor ($C_{FET}$), where a voltage applied to the second capacitor (FET) may be a gate voltage (Vg) applied to a gate electrode (21).

When gas particles are absorbed into the detection film (14), physical and electrical characteristic changes of detection film (14) of metal oxides may be induced, and as a result, there may be generated a capacitance change between the first electrode (12) and the second electrode (13). That is, there may be generated a capacitance change in the first capacitor (Cn).

When there is generated a capacitance change in the first capacitor (Cn), an operating voltage (Vrf) applied from outside may be voltage-distributed to the second capacitor ($C_{FET}$) in response to relationships as shown in Equations 1 and 2. As a result, the gas detection may be realized by a method where a controller (30) analyzes changes in drain-source current (Ids) based on changes in the gate voltage (Vg). In the following Equations, Vrf may mean an operating voltage applied from outside, Vn may mean a voltage distributed to the first capacitor (Cn), Vg may mean a voltage distributed to the second capacitor ($C_{FET}$), or a voltage applied to the gate electrode (21).

$$Vrf = Vn + Vg \quad \text{<Equation 1>}$$

$$CnVn = C_{FET}Vg \quad \text{<Equation 2>}$$

At this time, it is preferable that the capacitance of first capacitor (Cn) have a higher change rate in response to absorption of gas particles, and it is also preferable that size of capacitance at an initial sensor and that of inside of FET device (20) be similar because sensitive of gas detection is excellent when changes in distribution rate of voltage distributed to each capacitor by the operating voltage (Vrf) grows greater.

FIG. 4 illustrates an operating circuit where a plurality of sensors and switches are connected in parallel in the sensor array part (10), and an operating voltage (Vrf) is applied through each switch.

To be more specific, switches of each sensor may be sequentially driven by a controller (30). Through this process, changes of capacitance at each sensor may be detected (sensed) by the FET device (20). The controller (30) may periodically perform a process of sequentially driving all sensors, thereby enabling a real-time gas monitoring. Alternatively, each sensor may be sequentially driven by controlling switches in response to a situation where gas detection is required, or to a user or to an operating signal inputted from outside. In order to detect (sense) the gas using a plurality of sensors, capacitance changes of each sensor must be individually detected.

The capacitance changes sensed by each sensor may be detected using a single FET device by allowing a single FET device to be sequentially connected to one sensor in the plurality of sensors. Through this process, there is no need of each sensor being connected to respective FET devices. At this time, a plurality of FET devices may be used in response to the number or arrangement of sensor. For example, the gas sensor may be realized by using a sensor array formed with 18 sensors in which two FET devices are respectively connected to 9 sensors.

Each detection film (14) of the plurality of sensors may utilize several well-known metal oxide materials, and various factors may be changed by varying thickness of detection film (14) even if the same material is used, a mixed ratio of catalysis may be varied or sizes of holes are made to be different in case of porous materials.

Through these processes, a target gas may be selectively detected (sensed) by comparatively analyzing sensor array information based on mixed gas detection after initial values of each sensor having various change characteristics are stored. Furthermore, because increase or decrease in the number of sensors at the sensor array part (10) is comparatively easy, gas detection selectivity can be improved by using methods in which machine learning algorithm is applied by big dataization of characteristic changes of each sensor, or patterns of mixed gases are analyzed.

Figure 5:
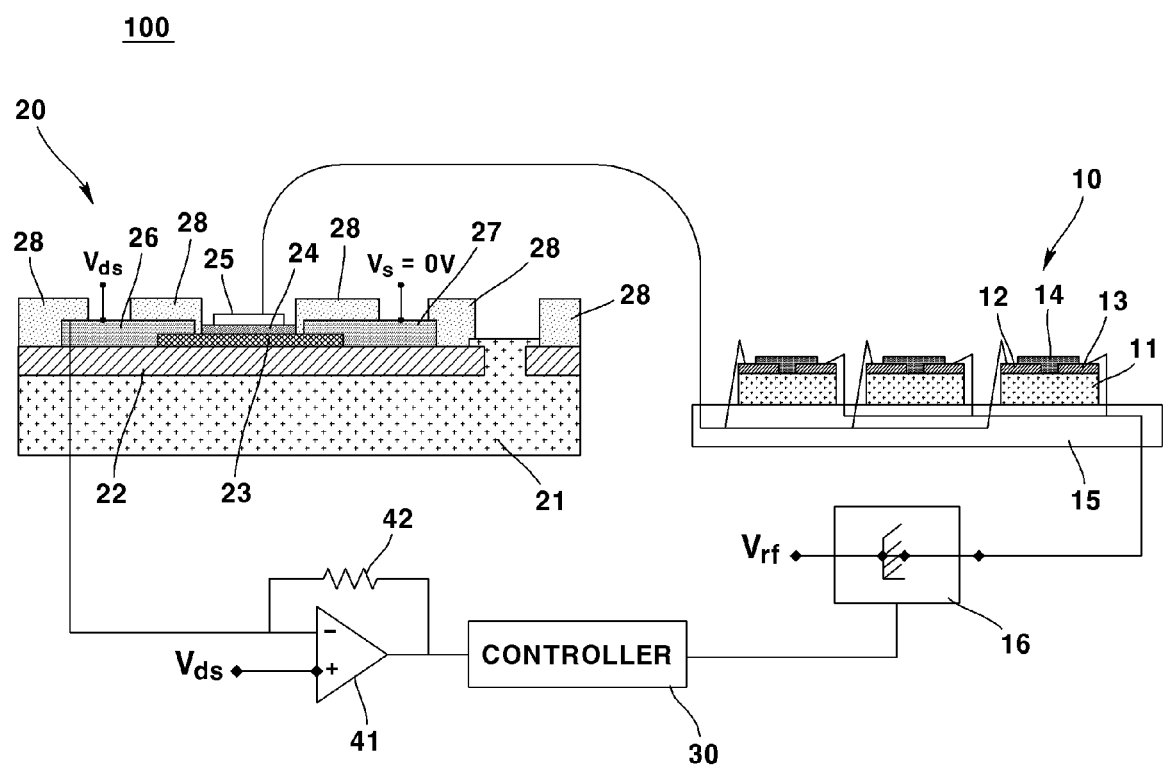
FIG. 5 illustrates a schematic view of a gas sensor according to an exemplary embodiment of the present invention.

FIG. 5 illustrates a schematic view of a gas sensor (100) according to an exemplary embodiment of the present invention.

The gas sensor (100) according to an exemplary embodiment of the present invention may include a sensor array part (10), an FET device (20) and a controller (30), and may further include an OP-amp (41). Redundant explanations on the sensor array part (10) that have been made using FIGS. 1 to 4 will be omitted.

A plurality of sensors of sensor array part (10) may be arranged on a PCB substrate (15) by way of N×N arrangement or A×B arrangement. One or more sensors may be used detectable of each gas based on the types of gases to be sensed. A single sensor may detect or sense one type of gas, or a plurality of sensors may detect or sense one type of gas. When a plurality of sensors detects one type of gas, an average value of values detected by the plurality of sensors may be determined as a detection value of a relevant gas. Furthermore, the plurality of sensors may be arranged in a same column by grouping sensors detecting particular gas, and the plurality of sensors may be arranged in a same column by grouping sensors including detection films of same material.

Furthermore, gases may be detected by controlling switches using various patterns by operating only a sensor made of particular metal oxide through control of a switch (16) based on user's purpose, or operating only a sensor that satisfies a particular condition.

The PCB substrate (15) may further include a heater (not shown) to allow an efficient absorption of gas particles to the detection film (14) of sensor. The heater may be an electrically-connected hot wire, and may be formed with a material that can be easily heated by a small current. However, the present invention is not particularly limited thereto.

The FET device (20) may include a first gate electrode (21), a dielectric layer (22) disposed at an upper surface of first gate electrode (21), an FET channel (23) disposed at an upper surface of the dielectric layer (22), a drain electrode (26) disposed at one end of the FET channel (23), a source electrode (27) disposed at the other end of the FET channel (23), an insulation layer (24) disposed at an upper surface of the FET channel (23) and a second gate electrode (25) disposed at an upper surface of the insulation layer (24), and may further a passivation (28) disposed at an upper surface of the second gate electrode (25), the drain electrode (26) and the source electrode (27). The FET device (20) may be a nano FET device.

The first gate electrode (21) may initialize the FET channel (23) by receiving a reference voltage (Vr) setting a drain-source current as an initial value. That is, drift characteristic of sensor signal can be improved and signal processing can be efficiently performed by setting or initializing an operation area of sensor by adjusting the reference voltage (Vr) applied to the first gate electrode (21), instead of initializing the sensor through attachment or detachment of gas particles to the detection film (14) of sensor.

The first gate electrode (21) may be disposed at a lower surface of dielectric layer (22), and may be formed with a shape of covering a part of an upper surface of the dielectric layer (22) by passing through a part of the dielectric layer (22). This is a structural design in order to ease an electrical connection between the FET device (20) and the sensor array part (10), arrangement of each device and voltage application. However, the present invention is not particularly limited thereto.

The dielectric layer (22) may enable the function of effectively generating an initialization process of sensor using the first gate electrode (21). The dielectric layer (22) may be formed with a film including silicon oxide ($SiO_2$). However, the present invention is not limited thereto.

The insulation layer (24) may be disposed at an upper surface of the FET channel (23), and may function to allow effectively generating a field effect at the FET channel (23). The insulation layer (24) may be so formed as to stretch over a part of the drain electrode (26) and the source electrode (27), and may be formed with a silicon oxide ($SiO_2$). However, the present invention is not limited thereto.

The second gate electrode (25) may be disposed at an upper surface insulation layer (24) to form an area receiving a gate voltage (Vg) from the sensor array part (10). That is, the second gate electrode (25) may be electrically connected to the first electrode (12) of each sensor of the sensor array part (10).

Although the first gate electrode (21) and the second gate electrode (25) are functionally explained by being divided for convenience sake, both the first gate electrode (21) and the second gate electrode (25) may receive a gate voltage from the sensor array part (10). For example, when the first gate electrode (21) is connected to apart of the plurality of sensors, the second gate electrode (25) may be connected to the remainder that is not connected to the first gate electrode (21) in the plurality of sensors.

The passivation (28) is obtained from a surface of the FET device (20) or a junction of each electrode that is adequately processed, and is intended to stabilize the characteristic of the FET device (20). As a result, the passivation (28) may be formed with a material capable of preventing a current leakage. However, the present invention is not limited thereto.

The drain electrode (26) of FET device (20) may be connected to an input terminal of OP-amp (41). To be more specific, when a voltage Vds is applied to a (+) pole of OP-amp (41) using the characteristic of same voltage being applied to (+) pole and (−) pole of input terminal in the OP-amp (41), the (−) pole is also applied with the voltage Vds, and therefore, the drain electrode (26) is also applied with the drain voltage (Vds).

A resistor (42) may be connected between an output terminal of OP-amp (41) and the (−) pole of input terminal, and the output terminal of the OP-amp (41) may be connected by a controller (30). When there is generated a change of current (Ids) in the drain-source due to the change in the gate voltage (Vg), the current Ids may flow to the (−) pole of the input terminal of OP-amp (41) through the drain electrode (26), and may flow to the output terminal of OP-amp (41) by passing the resistor. As a result, the output terminal of the OP-amp (41) may detect a voltage which is a square of current (Ids) and resistor (42) values, where the controller (30) may detect (sense) the gas through analysis of voltage changes detected from the output terminal of OP-amp (41).

Figure 6:
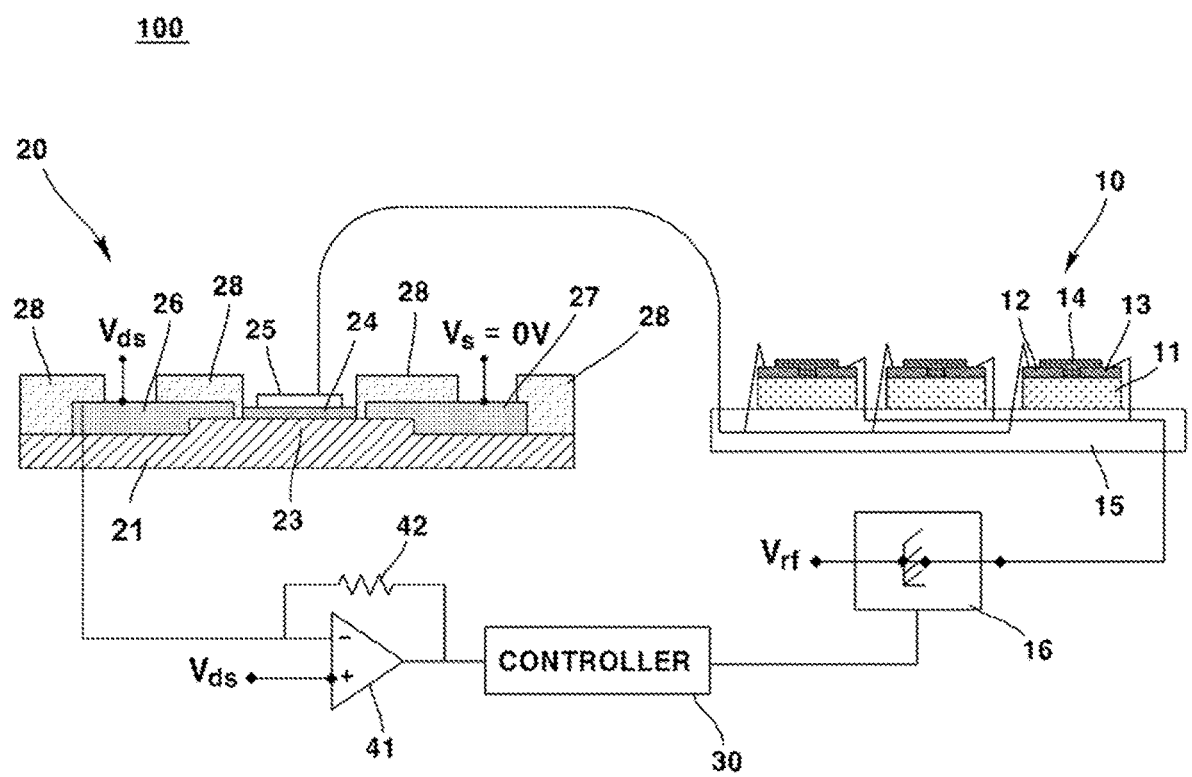
FIG. 6 illustrates a schematic view of a gas sensor according to another exemplary embodiment of the present invention.

FIG. 6 illustrates a schematic view of a gas sensor according to another exemplary embodiment of the present invention. Redundant explanations on the gas sensor (100) that have been made using FIG. 5 will be omitted hereinafter.

Referring to FIG. 6, the FET device (20) according to another exemplary embodiment of the present invention may include a substrate (21), a drain electrode (26) disposed at an upper surface of the substrate (21), a source electrode (27) spaced apart from the drain electrode (26) to be disposed at an upper surface of the substrate (21), an insulation layer (24) interposed between the drain electrode (26) and the source electrode (27), and a gate electrode (25) disposed at an upper surface of the insulation layer (24), and may further include a passivation (28) disposed at an upper surface of drain electrode (26) and source electrode (27).

Unlike the FET device (20) described through FIG. 5, the FET device (20) illustrated in FIG. 6 may include a single gate electrode (25). That is, when a gate voltage (Vg) is applied to the single gate electrode (25), a field effect may be generated because a FET channel (23) is formed between the drain electrode (26) and the source electrode (27), where the FET channel (23) may be formed at a partial area of the substrate (21).

Now, an operation principle of the gas sensor (100) according to an exemplary embodiment of the present invention will be described.

An operating voltage (Vrf) is sequentially applied to each sensor prior to absorption of gas particles to the detection film (14), and an initial FET device (20) value is stored. At this time, the FET device (20) value may be a drain-source current (Ids), or may be a voltage measured at the output terminal of the OP-amp (41). However, the present invention is not limited thereto.

Thereafter, the gas particles are absorbed on to the detection film (14) to allow the capacitance of first capacitor (Cn) to be changed, and the gate electrode (Vg) is applied to the gate electrode (25) in response to voltage distribution of first capacitor (Cn) of sensor and the second capacitor ($C_{FET}$) of FET device (20).

At this time, the drain electrode (26) may be applied with a drain voltage (Vds) by being connected to an input terminal of OP-amp (41), the source electrode (27) may be applied with 0[V] while being grounded. The drain-source current (Ids) is also changed in response to the changes in the gate voltage (Vg), which is a basic operating principle of FET device and therefore, detailed explanation thereto will be omitted.

The drain-source current (Ids) may flow to an output terminal of OP-amp (41) while flowing to the (−) pole of input terminal of OP-amp (41) by passing through the resistor (42), and the controller (30) may analyze changes of current Ids at the output terminal of OP-amp (41), or may detect the gas by analyzing the voltage changes.

The gas sensor (100) according to an exemplary embodiment of the present invention is configured in such a manner that a single FET device is formed with two gate electrodes to allow said one gate electrode to be connected to the sensor whereby gas can be detected through changes in gate voltage, and the other gate electrode is applied with the reference voltage (Vr) to enable an initialization of FET channel. That is, the reference voltage (Vr) applied to the other gate electrode can be adjusted without an initialization process of a sensor through attachment or detachment of gas particles to set an operation area of sensor or to initialize, through which the one gate electrode and one sensor in the plurality of sensors may be sequentially connected, whereby gas can be detected through detection of changes in capacitance detected from the plurality of sensors using a single FET device.

The gas detection method according to an exemplary embodiment of the present invention includes: applying an operating voltage to one sensor in a plurality of sensors forming a sensor array part; detecting a current between a drain-source in response to voltage changes of first gate electrode of FET device connected to a plurality of sensors; and detecting a gas using a current change between the drain-source.

Detailed description on each step of gas detection method according to an exemplary embodiment of the present invention corresponds to that of gas sensor illustrated in FIGS. 1 to 6, such that redundant explanation thereto will be omitted.

It should be understood that the abovementioned description is simply exemplary of the technical ideas of the present invention, and numerous other modifications can be devised by those skilled in the art that will not deviate from the aforementioned essential characteristics of the technical fields related to the principles of this invention. Therefore, it should be understood that the above-described embodiments are not limited by any of the details of the foregoing description and drawings, but defined by appended claims, and it should be interpreted that all the differences within the equivalent scopes thereof are included in the present disclosure.

DESCRIPTION OF REFERENCE NUMERALS

100: gas sensor
10: sensor array part
20: FET device
30: controller
41: OP-amp

The invention claimed is:

1. A gas sensor, comprising:
a single FET device including a first gate electrode and a second gate electrode;
a sensor array part including a plurality of sensors, in which a first electrode of each sensor of the plurality of sensors is connected to the second gate electrode of the single FET device; and
a controller configured to detect a gas using a current between a drain and a source of the single FET device in response to voltage changes in the second gate electrode of the single FET device,
wherein each sensor of the plurality of sensors includes:
the first electrode connected to the second gate electrode of the single FET device;
a second electrode configured to receive an operating voltage through a switch controlled by the controller; and
a detection film interposed between the first electrode and the second electrode, and
wherein the first gate electrode is configured to apply with a reference voltage setting the current between the drain and the source as an initial value.

2. The gas sensor of claim 1, wherein
the drain of the single FET device is connected to an input terminal of OP-amp and an output terminal of the OP-amp is connected to a controller.

3. The gas sensor of claim 1, wherein the controller controls the switch to allow the operating voltage to be sequentially applied to the second electrode of each sensor of the plurality of sensors.

4. The gas sensor of claim 1, wherein the detection film of each sensor of the plurality of sensors is different from the detection film of each other sensor of the plurality of sensors.

5. The gas sensor of claim 1, wherein the sensor array part further includes a heater.

6. A gas sensor comprising:
a single FET device including a first gate electrode and a second gate electrode;
a sensor array part including a plurality of sensors, wherein a first electrode of each sensor of the plurality of sensors is connected to a gate electrode of the single FET device; and
a controller detecting a gas using a current between a drain and a source of the single FET device in response to voltage changes of the gate electrode of the single FET device, wherein
each sensor of the plurality of sensors includes:
the first electrode connected to the gate electrode of the single FET device;
a second electrode configured to receive an operating voltage through a switch controlled by the controller; and a detection film interposed between the first electrode and the second electrode.

7. The gas sensor of claim 6, wherein the drain of the FET device is connected to an input terminal of OP-amp, and an output terminal of the OP-amp is connected to the controller.

8. The gas sensor of claim 6, wherein the controller controls the switch to allow the operating voltage to be sequentially applied to the second electrode of each sensor of the plurality of sensors.

9. A gas sensing method, comprising:
applying an operating voltage to one sensor in a plurality of sensors forming a sensor array part;
detecting a current between a drain and a source of a single FET device in response to voltage changes of a first gate electrode of the single FET device connected to the plurality of sensors, wherein the sensor array part includes the plurality of sensors, in which a first electrode of each sensor of the plurality of sensors is connected to the first gate electrode of the single FET device; and
detecting a gas using a current change between the drain and the source of the single FET device.

10. The gas sensing method of claim 9, wherein each sensor of the plurality of sensors includes a mutually different type of detection film.

* * * * *